(12) United States Patent
Hu et al.

(10) Patent No.: US 8,837,136 B2
(45) Date of Patent: Sep. 16, 2014

(54) HOUSING FOR HARD DISK DRIVE

(75) Inventors: Xiu-Quan Hu, Shenzhen (CN); Lin-Han Wu, Shenzhen (CN); Li Hou, Shenzhen (CN); Wei Wang, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 207 days.

(21) Appl. No.: 13/445,931

(22) Filed: Apr. 13, 2012

(65) Prior Publication Data

US 2013/0099639 A1    Apr. 25, 2013

(30) Foreign Application Priority Data

Oct. 25, 2011    (CN) .......................... 2011 1 0327296

(51) Int. Cl.
*G06F 1/16*    (2006.01)

(52) U.S. Cl.
USPC ................. 361/679.33; 248/220.21; 345/419; 360/254

(58) Field of Classification Search
CPC .......... G06F 1/00; G06F 2003/00; G06K 1/00
USPC .......... 312/223.1, 223.2, 223.3, 319.2, 332.1;
361/679.31, 679.32, 679.33, 679.34,
361/679.35, 679.37, 679.38, 679.4, 679.43,
361/679.47, 679.54, 679.21, 679.26,
361/679.16, 679.09, 679.55, 679.59,
361/679.02, 679.56, 679.39; 360/99.08,
360/235.4, 75, 128, 97.14, 97.22, 97.16,
360/245.8, 254, 264.2; 165/80.2, 104.26,
165/104.14, 104.33, 80.3; 345/173, 174,
345/204, 55, 690, 419, 32, 168, 652, 520,
345/170; 455/556.1, 566, 179.1, 2.01,
455/575.1; 248/221.11, 636, 224.8, 220.21,
248/309.1, 314, 220.22, 205.1, 276.1,
248/122.1, 558
See application file for complete search history.

(56) References Cited

U.S. PATENT DOCUMENTS

| | | | |
|---|---|---|---|
| 2011/0101831 A1* | 5/2011 | Wang et al. | 312/223.1 |
| 2012/0147548 A1* | 6/2012 | Lin et al. | 361/679.31 |
| 2013/0147332 A1* | 6/2013 | Hu et al. | 312/319.2 |

* cited by examiner

*Primary Examiner* — Hung Duong
(74) *Attorney, Agent, or Firm* — Novak Druce Connolly Bove + Quigg LLP

(57) ABSTRACT

An exemplary housing for a hard disk drive includes an enclosure, a bracket slidably mounted in the enclosure, and a panel mounted to the bracket. The bracket supports the hard disk drive thereon. The panel includes a cover pivotably connected to the bracket and an operation bracket mounted to the cover. The panel can be rotated to a closed status where the operation bracket is pulled by a spring to lock with the enclosure, thereby to fix the cover to the enclosure. The panel can also be rotated to an open status where the operation bracket is detached from the enclosure, whereby the bracket can slide out of the enclosure to expose the hard disk drive.

18 Claims, 7 Drawing Sheets

HOUSING FOR HARD DISK DRIVE

BACKGROUND

1. Technical Field

The present disclosure relates to device housings, and more particularly, to a housing for receiving a hard disk drive.

2. Description of Related Art

Typical computers have hard disk drives for storing data. For some kinds of computers such as servers or workstations, a large amount of data is required to be stored. Thus, such kinds of computers may incorporate a multiplicity of hard disk drives therein. Generally, each hard disk drive is received in a housing for protection. In order to access any one of the hard disk drives, the corresponding housing generally includes an access panel. When any one of the hard disk drives is required to be maintained, repaired or replaced, by loosening screws threadedly engaged in the panel, the panel can be detached from the housing to expose the hard disk drive inside the housing. However, the detachment of the door from the housing is inconvenient and time-consuming.

What is needed, therefore, is a housing for a hard disk drive which can overcome the limitations described above.

BRIEF DESCRIPTION OF THE DRAWINGS

Many aspects of the present disclosure can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the views.

DETAILED DESCRIPTION

Figure 1:
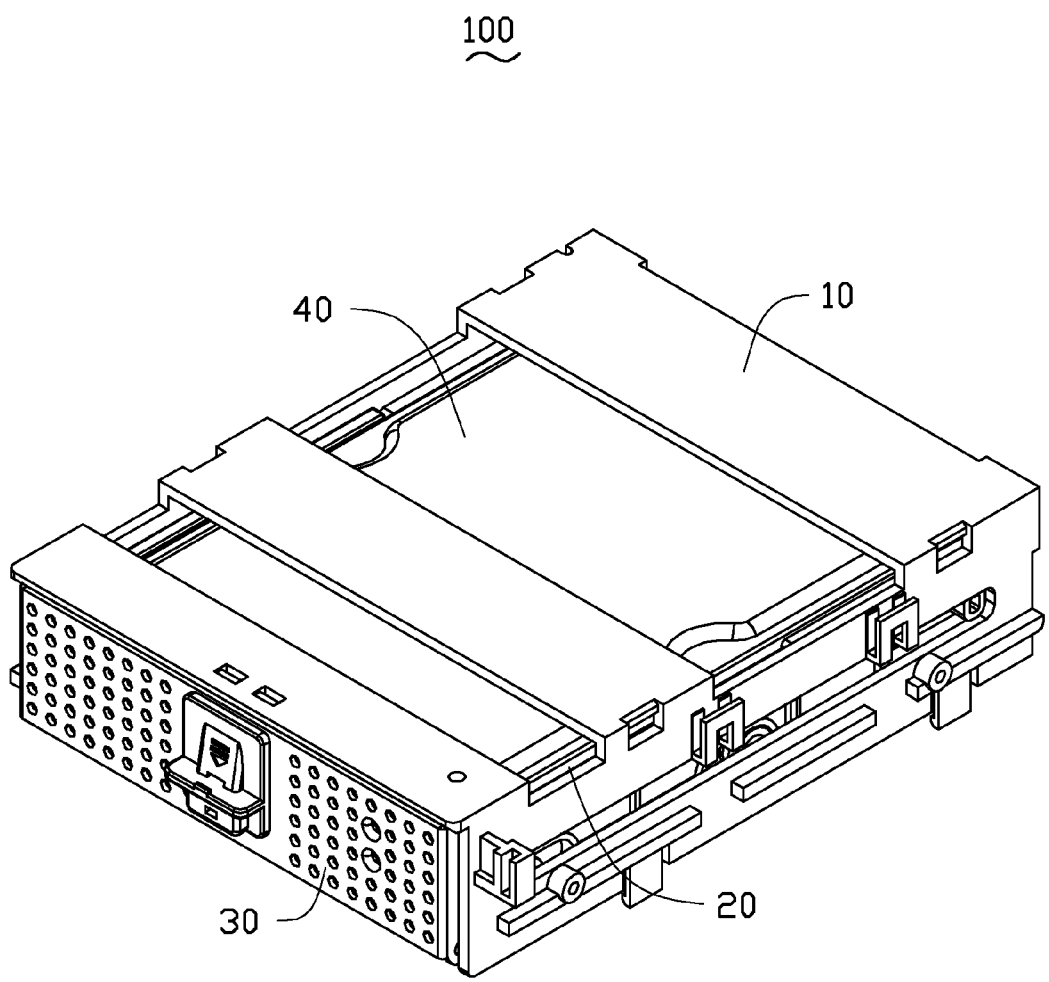
FIG. 1 is an isometric, assembled view of a housing in accordance with an embodiment of the present disclosure, wherein a hard disk drive is received in the housing.

Referring to FIG. 1, a housing 100 for a hard disk drive 40 in accordance with an embodiment of the present disclosure is shown. The housing 100 includes an enclosure 10, a bracket 20 movably mounted in the enclosure 10, and a panel 30 rotatably mounted to the enclosure 10.

Figure 2:
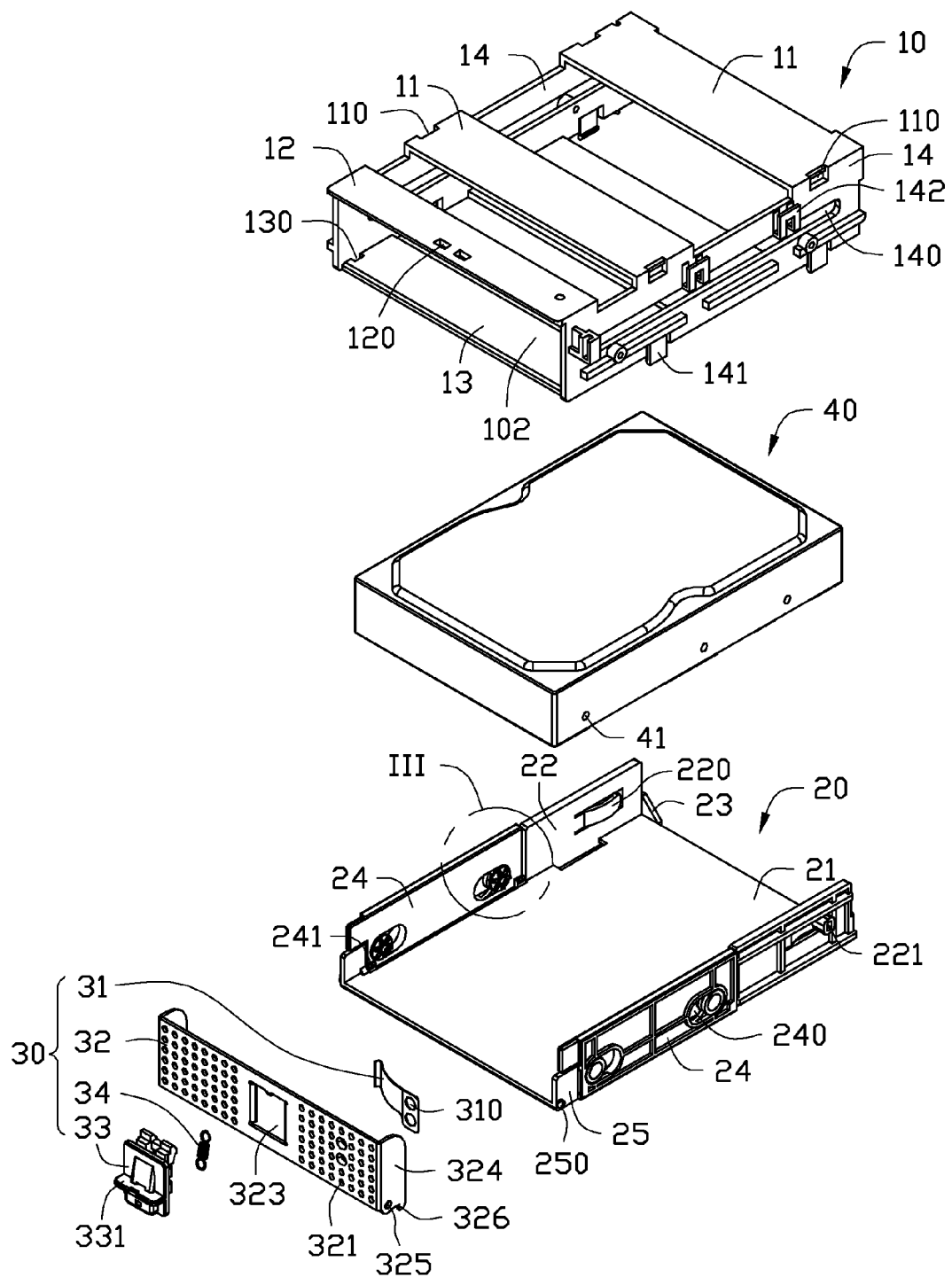
FIG. 2 is an exploded view of FIG. 1.
Figure 3:
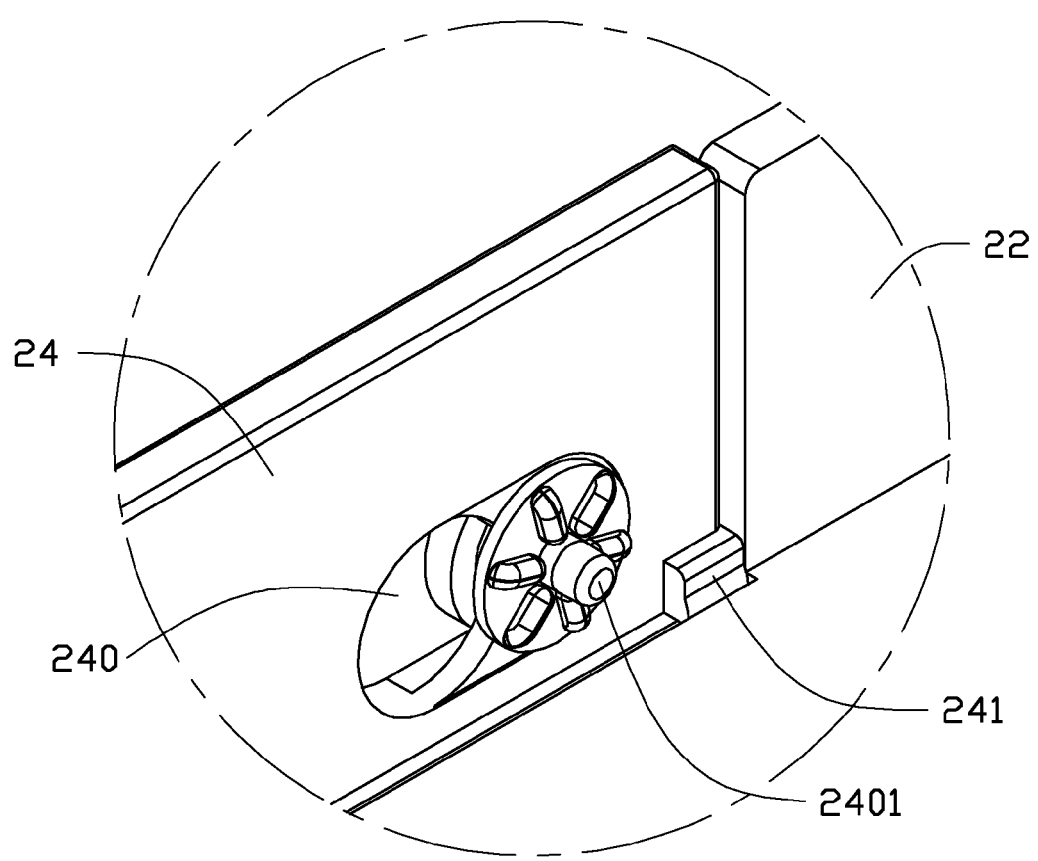
FIG. 3 is an enlarged view of a circled part III of FIG. 2.

Also referring to FIGS. 2-3, the enclosure 10 includes two side plates 14, two bottom plates 13 connected to bottoms of the two side plates 14, and two first top plates 11 and a second top plate 12 connected to tops of the two side plates 14. The two side plates 14 are parallel to each other. The two bottom plates 13 are parallel to the two top plates 11, and perpendicular to the two side plates 14. Each side plate 14 defines a slot 140 along a lengthwise direction thereof. The two top plates 11 are staggered with respect to the two bottom plates 13. Each top plate 11 defines two holes 110 in two opposite ends thereof, respectively. Each hole 110 extends into a top portion of a corresponding side plate 14. In other words, each hole 110 is located at a joint of the corresponding side plate 14 and the adjacent top plate 11. Two buckles 141 extend downwardly from each side plate 14, aligning with the two holes 110, respectively. The buckles 141 of the enclosure 10 can be locked in corresponding holes of a lower enclosure (not shown), and the buckles of an upper enclosure (not shown) can be locked in the corresponding holes 110 of the enclosure 10. In this way, a plurality of the enclosures 10 can be stacked one on the other. The second top plate 12 defines two apertures 120 in a position adjacent to a front side and a middle thereof. The second top plate 12, the two side plates 14 and a front one of the bottom plates 13 cooperatively define a window 102 therebetween at a front side of the enclosure 10. The front bottom plate 13 defines two holes 130 near the window 102. Two baffle plates 15 are formed on rear ends of the two side plates 14, respectively. Each baffle plate 15 is triangular, and interconnects a corresponding side plate 14 and a rear one of the top plates 11. The two baffle plates 15 prevent the bracket 20 from moving out of the enclosure 10 from a rear side of the enclosure 10.

Figure 4:
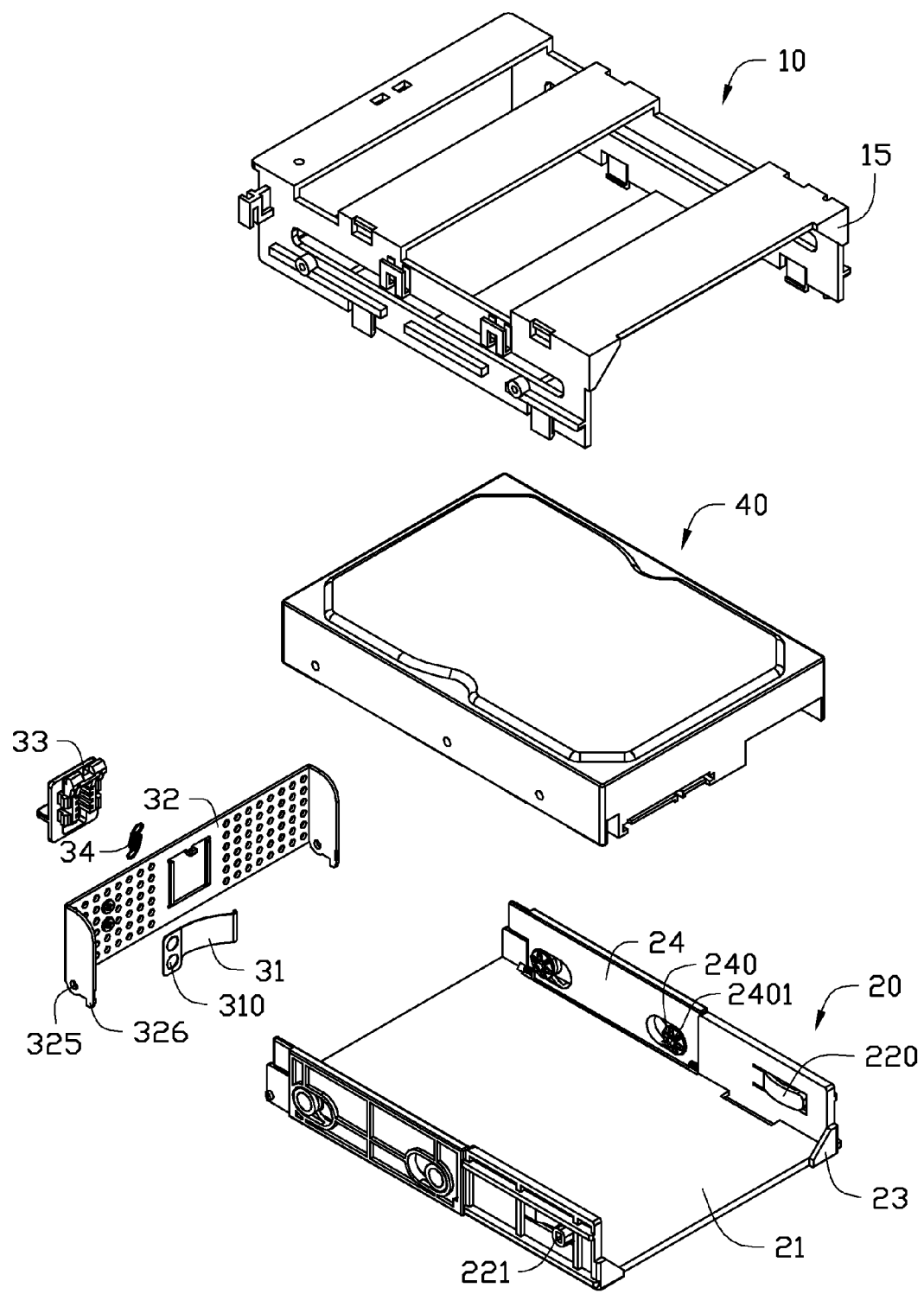
FIG. 4 shows a rear view of FIG. 2.
Figure 5:
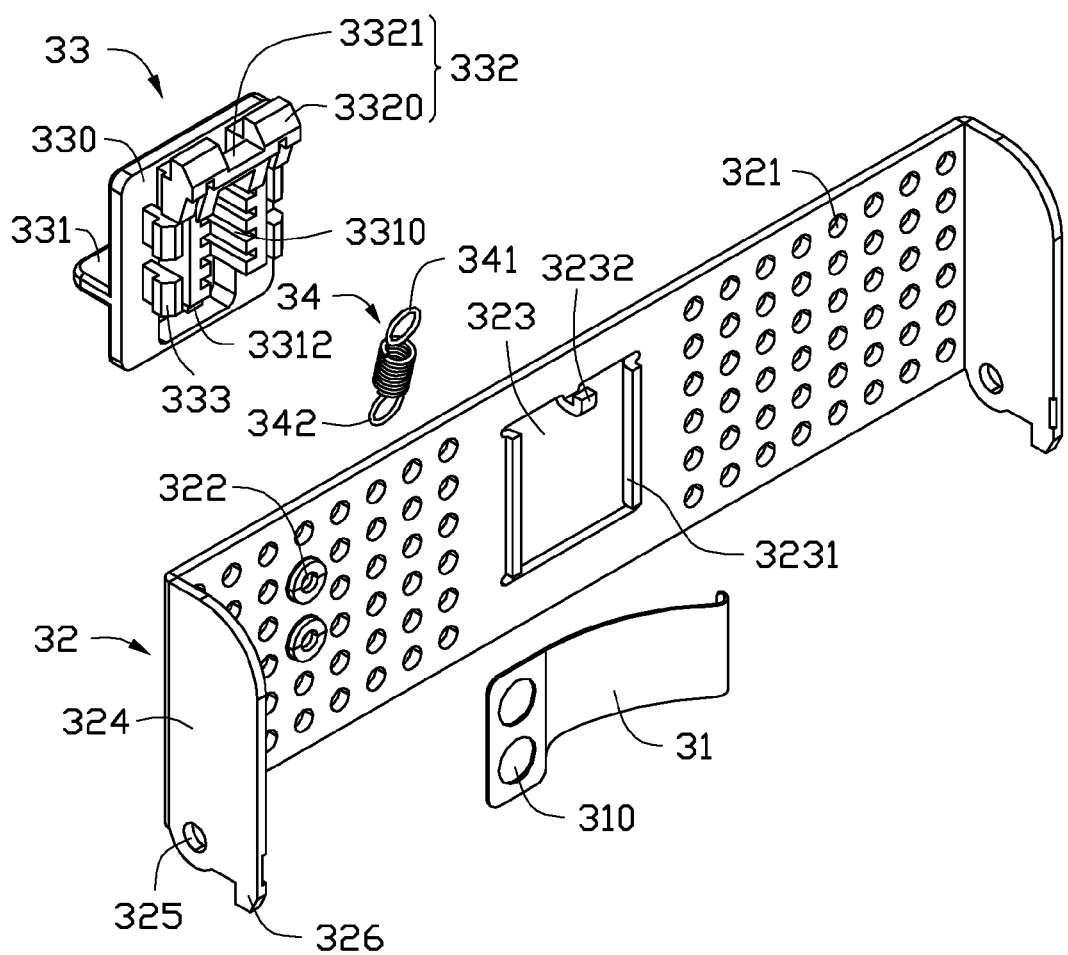
FIG. 5 is an enlarged view of a panel of FIG. 4.

Also referring to FIGS. 4-5, the bracket 20 includes a bottom wall 21, two side walls 22 respectively extending upwardly from a left side and a right side of the bottom wall 21, two retention walls 25 respectively extending upwardly from the left side and the right side of the bottom wall 21, and two rotation walls 24 respectively extending upwardly from the left side and the right side of the bottom wall 21. Each rotation wall 24 interconnects an adjacent side wall 22 and an adjacent retention wall 25. The bottom wall 21 has a width less than that of each bottom plate 13 of the enclosure 10, so that the bracket 20 can be received in the enclosure 10. The two side walls 22 are located adjacent to a rear side of the bottom wall 21. The two side walls 22 are perpendicular to the bottom wall 21 and parallel to the retention walls 25. A central portion of each side wall 22 is depressed inwardly to form a curved pressing tab 220. When the hard disk drive 40 is received between the two side walls 22, the two pressing tabs 220 are elastically deformed to press the hard disk drive 40 and fix the hard disk drive 40 in the bracket 20. Each side wall 22 forms a protrusion 221 protruding outwardly in a direction away from the pressing tab 220. The protrusion 221 can be received in a corresponding slot 140 to guide the bracket 20 to slide relative to the enclosure 10.

The retention walls 25 are located adjacent to a front side of the bottom wall 21. Each retention wall 25 has a height less than that of each side wall 22. Each retention wall 25 has a pole 250 extending outwardly. Each rotation wall 24 is located between the adjacent retention wall 25 and the adjacent side wall 22. The rotation wall 24 is pivotably connected to the retention wall 25 and the side wall 22, with a rotating axis of the rotation wall 24 parallel and adjacent to the bottom wall 21. The rotation wall 24 can be pivotally connected to the retention wall 25 and the side wall 22 by extending an axle 241 through the rotation wall 24 into adjacent portions of the retention wall 25 and the side wall 22. The two rotation walls 24 can be rotated outwardly to open statuses in which the rotation walls 24 are substantially coplanar with the bottom wall 21. The two rotation walls 24 also can be rotated inwardly from the open statuses to closed statuses in which the rotation walls 24 are perpendicular to the bottom wall 21. Each rotation wall 24 has two through holes 240 defined therein, and two fixing disks 2401 respectively connected in the through holes 240. An innermost end of each fixing disk 2401 can be inserted in a corresponding hole 41 (shown in FIG. 2) defined in a lateral face of the hard disk drive 40, for fixing the hard disk drive 40 to the rotation walls 24.

A pair of baffle walls 23 are formed at a rear side of the bracket 20. Each baffle wall 23 connects a corresponding side wall 22 and the bottom wall 21. The two baffle walls 23 are used to prevent the hard disk drive 40 from sliding out of the bracket 21 from a rear side of the bracket 21.

The panel 30 includes a rectangular cover 32, a pressing sheet 31 connected to the cover 32, an operation bracket 33 connected to the cover 32, and a spring 34 connected to the operation bracket 33. A multiplicity of holes 321 are defined in the cover 32. All but two of the holes 321 function as vent holes (see also below). Two collars 322 are formed on a rear face of the cover 32 corresponding to two right holes 321. The pressing sheet 31 is elongated and defines two holes 310 in a right end thereof. The two collars 322 of the cover 32 are engaged in the two holes 310 of the pressing sheet 31 to fix the pressing sheet 31 to the cover 32. A left end of the pressing sheet 31 is free to press a front side of the hard disk drive 40 when the cover 32 is rotated to a vertical orientation relative to the bottom wall 21. The pressing sheet 31 is curved and is elastically deformable. Two side flanges 324 extend rearward from a left end and a right end of the cover 32, respectively. Each side flange 324 defines a hole 325 neighboring a bottom thereof. The poles 250 of the retention walls 25 respectively extend through the holes 325 of the flanges 324, whereby the cover 32 is pivotally connected to the bracket 20. Each side flange 324 forms a leg 326 adjacent to the hole 325. The legs 326 can be engaged in the two holes 130 of the bottom plate 13 of the enclosure 10, to orient the panel 30 perpendicular to the bottom plate 13. A quadrate opening 323 is defined in a center of the cover 32 to receive the operation bracket 33. The cover 32 has two guiding flanges 3231 bent backward from a left side and a right side of the opening 323. A hook 3232 is formed on a middle of a top side of the opening 323. The hook 3232 extends firstly backward and then upwardly. The spring 34 has a first coil 341 formed in one end and a second coil 342 formed in the other end. The first coil 341 is engaged with the hook 3232 of the cover 32 to fix the one end of the spring 34 to the cover 32.

The operation bracket 33 includes a main portion 330, and a confining flange 331 extending frontward from the main portion 330. The main portion 330 defines a cavity 3310 in a rear face thereof. The confining flange 331 is perpendicular to the main portion 330. Two hooks 333 extend from the rear face of the main portion 330, adjacent to a left side of the cavity 3310; and two hooks 333 extend from the rear face of the main portion 330, adjacent to a right side of the cavity 3310. The four hooks 333 engage with the two guiding flanges 3231 of the cover 32 to mount the operation bracket 33 to the cover 32. The operation bracket 333 is slidable along a widthwise direction of the cover 32 by guidance of the two guiding flanges 3231. The confining flange 331 can press against a bottom inner edge of the cover 32 bordering the opening 323, to confine a downward movement of the operation bracket 333. A locking portion 332 extends from the rear face of the operation bracket 33, adjacent to a top side of the cavity 3310. A hook 3312 is formed inside the cavity 3310. The hook 3312 engages with the second coil 342 of the spring 34 to fix the other end of the spring 34 to the operation bracket 33. The locking portion 332 has two protrusions 3320 spaced by a clearance 3321. The two protrusions 3320 can respectively be inserted into the two apertures 120 of the enclosure 10 to lock the panel 30 to the enclosure 10. The spring 34 is elastically stretched to hold the operation bracket 33 in a locked position in which a top face of the locking portion 332 bordering a bottom of the clearance 3321 abuts against a bottom face of the hook 3232. In the locked position, the two protrusions 3320 of the operation bracket 33 are locked in the two apertures 120 to fix the panel 30 to the enclosure 10, and the pressing sheet 310 is compressed between the rear side of the cover 32 and the front side of the hard disk drive 40. Thus, when the operation bracket 33 is in the locked position, the panel 30 is in a closed status. The spring 34 can be further stretched to produce an elastic restoring force when the operation bracket 33 is pressed by an operator to slide downwardly to a released position. In the released position, the two protrusions 320 of the operation bracket 33 are clear from the two apertures 120, so that the panel 30 is in an open status in which the panel 30 can be rotated away from the enclosure 10.

Figure 6:
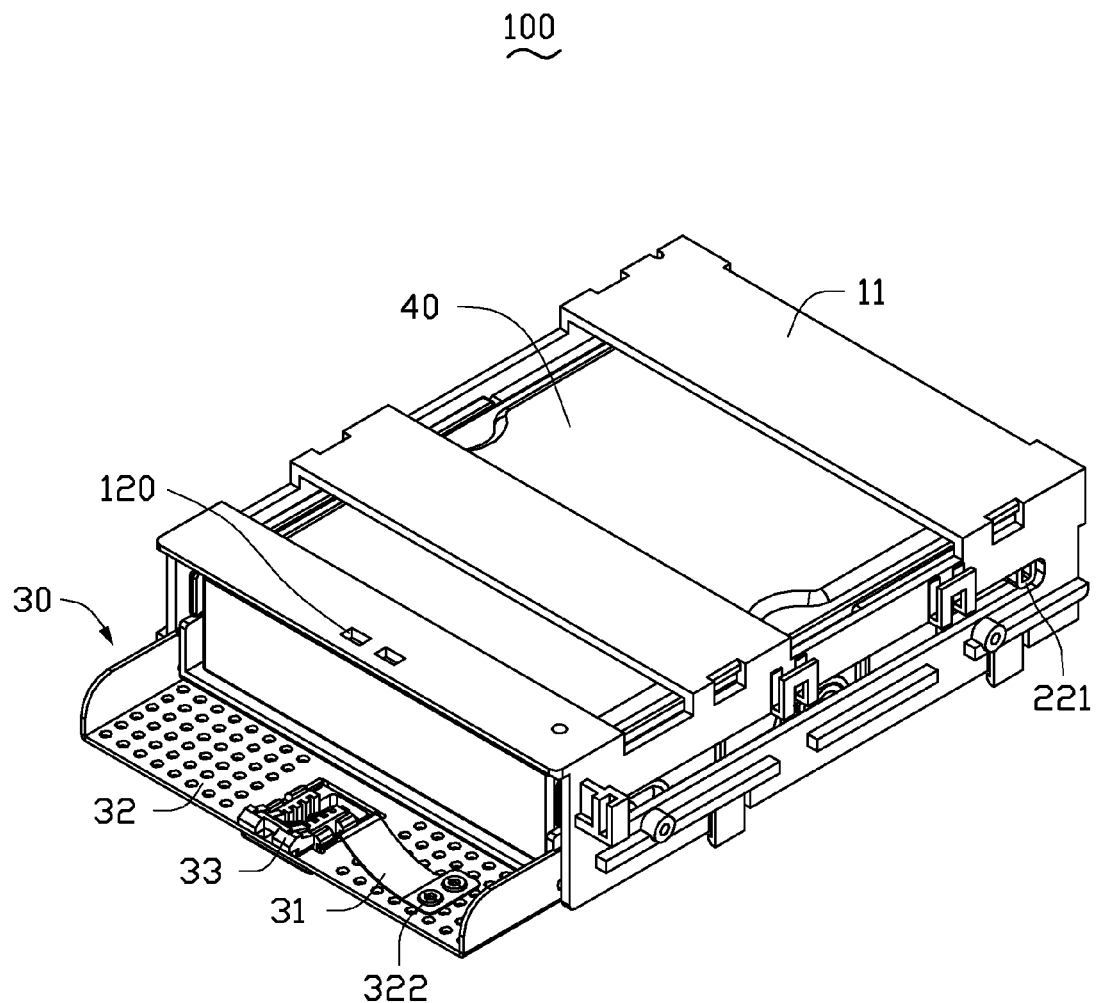
FIG. 6 is similar to FIG. 1, but showing the panel opened.
Figure 7:
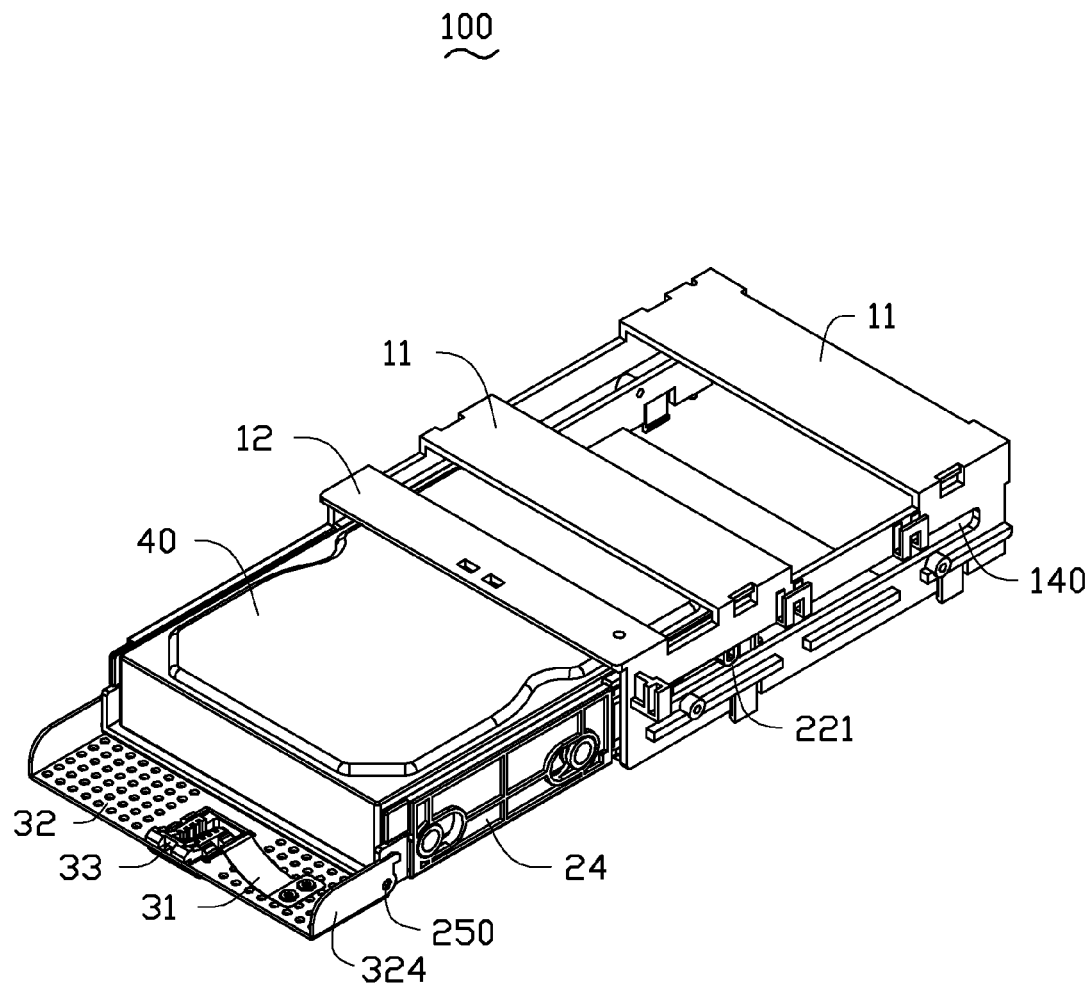
FIG. 7 is similar to FIG. 6, but showing the housing opened.

Also referring to FIGS. 6-7, when access to the hard disk 40 is required, the confining flange 331 of the operation bracket 33 is pressed downwardly by the operator, so that the operation bracket 33 is detached from the second top plate 12 of the enclosure 10. The panel 30 is automatically rotated outwardly by restoring pressure of the pressing sheet 31. The bracket 20 is then slid out from the enclosure 10 by the operator to expose the hard disk drive 40. The two rotation walls 24 of the bracket 20 are rotated outwardly by the operator to the open statuses. The hard disk drive 40 is then easily taken out from the bracket 20. Thus, replacement, repair and maintenance of the hard disk drive 40 are convenient and labor-saving.

It is believed that the present disclosure and its advantages will be understood from the foregoing description, and it will be apparent that various changes may be made thereto without departing from the spirit and scope of the present disclosure or sacrificing all of its material advantages, the examples hereinbefore described merely being preferred or exemplary embodiments.

What is claimed is:

1. A housing for a hard disk drive, comprising:
   an enclosure comprising a top plate defining an aperture therein;
   a bracket slidably mounted in the enclosure, the bracket configured for supporting the hard disk drive; and
   a panel comprising a cover pivotally connected to the bracket, an operation bracket mounted to the cover, and a spring interconnecting the operation bracket and the cover, the cover comprising two side flanges extending from a left side and a right side of the cover, respectively, the operation bracket comprising a protrusion which is inserted in the aperture to lock the operation bracket with the enclosure;
   wherein the panel is pivotable between a closed status in which the operation bracket is pulled by the spring to lock with the enclosure to fix the panel to the enclosure, and an open status in which the operation bracket is detached from the enclosure; and
   in the open status, the panel is rotatable away from the enclosure and the bracket is then slidable out of the enclosure to expose the hard disk drive.

2. The housing of claim 1, wherein the panel further comprises an elastically deformable pressing sheet with an end fixed to the cover and an opposite free end, the pressing sheet being compressed between the cover and the hard disk drive when the panel is in the closed status.

3. The housing of claim 1, wherein the operation bracket comprises a main portion mounted to the cover, the protrusion being formed on a rear face of the main portion.

4. The housing of claim 3, wherein the operation bracket further comprises a confining flange on a front face of the main portion, the confining flange being able to be pressed downwardly to drive the protrusion away from the aperture of the top plate, to thereby detach the operation bracket from the enclosure.

5. The housing of claim 4, wherein the cover defines an opening in a center of the cover, the operation bracket being received and exposed within the opening.

6. The housing of claim 5, wherein the cover comprises two guiding flanges formed adjacent to two opposite sides of the opening, and the operation bracket comprises two hooks engaging with the two guiding flanges, respectively, the operation bracket being slidable relative to the cover along a width direction of the cover.

7. The housing of claim 6, wherein the operation bracket defines a cavity in the rear face of the main portion, and the cover comprises a hook extending from a top side of the opening, one end of the spring being fixed within the cavity and an opposite end of the spring being fixed to the hook of the cover.

8. The housing of claim 7, wherein the hook of the cover is located outside of the cavity.

9. The housing of claim 4, wherein the bracket comprises two poles extending through the two side flanges, respectively.

10. The housing of claim 9, wherein the bracket comprises a bottom wall and two retention walls extending upwardly from two opposite sides of the bottom wall, the two poles being formed on the two retention walls, respectively.

11. The housing of claim 10, wherein the bracket comprises two side walls formed on the two opposite sides of the bottom wall and a pair of rotation walls each connected between an adjacent side wall and an adjacent retention wall.

12. The housing of claim 11, wherein each of the rotation walls is rotatable with respect to the adjacent side wall and adjacent retention wall.

13. The housing of claim 11, wherein each side wall has a part depressed inwardly to form a pressing tab for elastically pressing against the hard disk drive.

14. The housing of claim 11, wherein the bracket comprises two baffle walls each interconnecting the bottom wall and a corresponding side wall.

15. The housing of claim 11, wherein the enclosure comprises two side plates and a bottom plate connected between bottoms of the two side plates, the top plate being fixed on tops of the side plates.

16. The housing of claim 15, wherein each of the side plates defines a slot along a lengthwise direction thereof, each of the side walls having a protrusion received in the slot of a corresponding side plate to guide the bracket to slide relative to the enclosure.

17. The housing of claim 15, wherein the enclosure comprises another top plate connected between the tops of the side plates, the top plate being located adjacent to the another top plate.

18. The housing of claim 17, wherein the enclosure defines two apertures at joints of the two side plates and the another top plate, the enclosure forming two buckles extending downwardly from bottoms of the two side plates, respectively.

* * * * *